(No Model.) 3 Sheets—Sheet 2.
O. B. PECK.
APPARATUS FOR TREATING SLAG.
No. 433,138. Patented July 29, 1890.
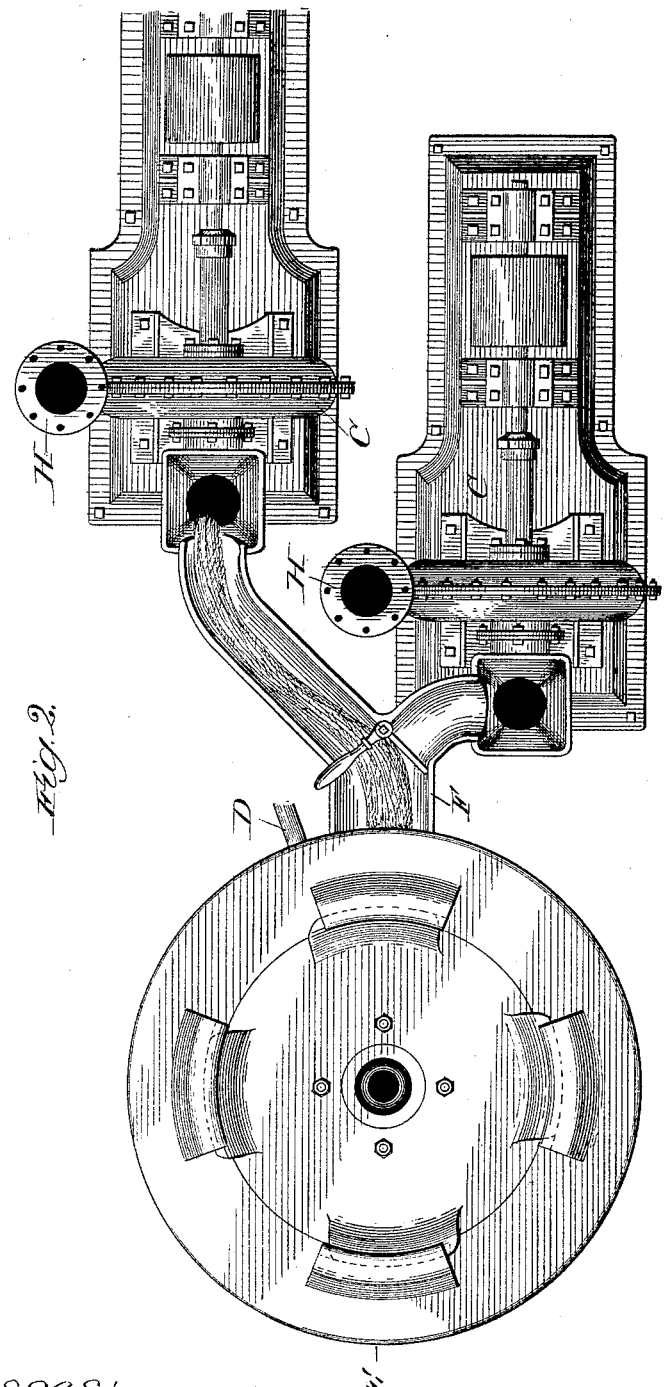

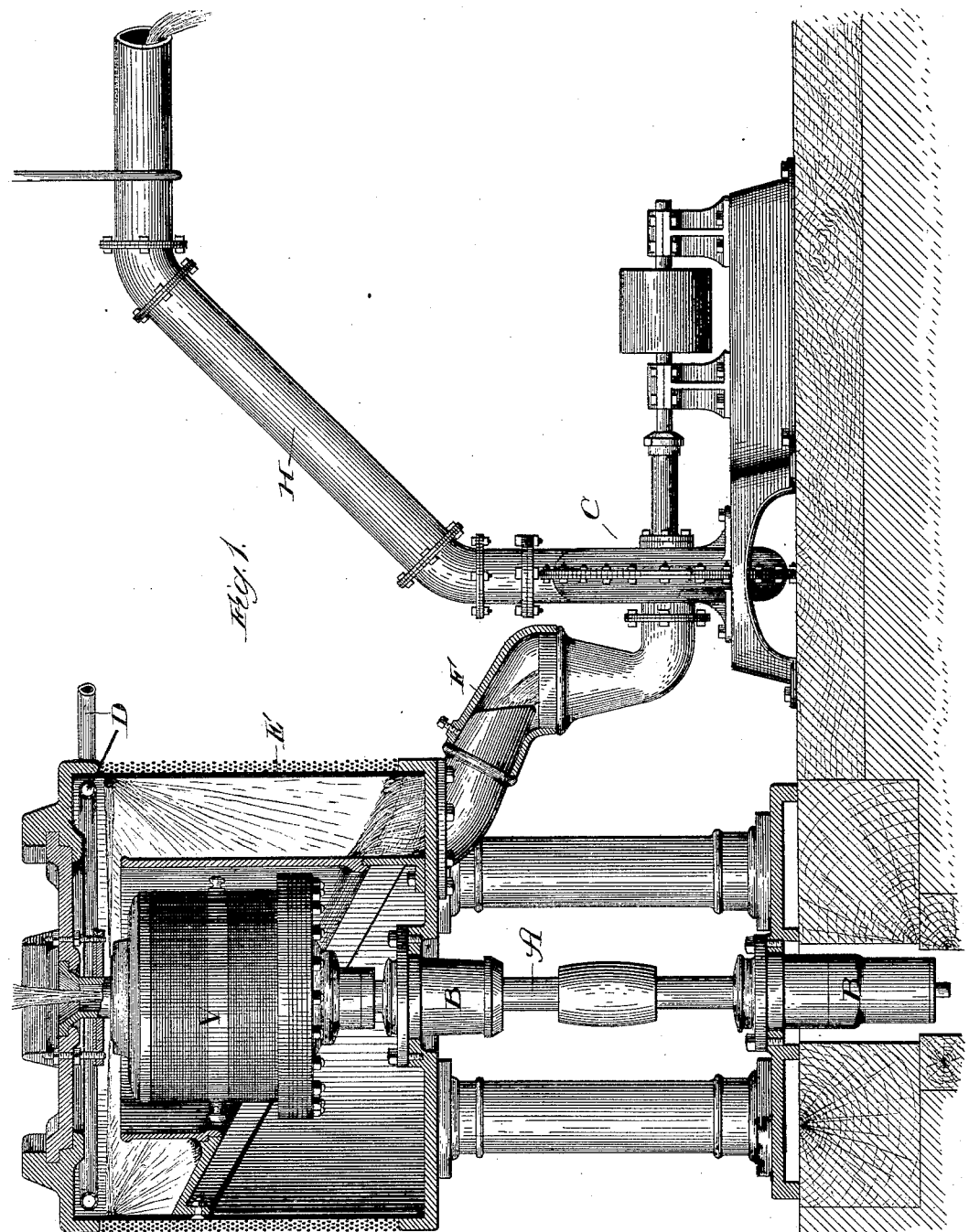

(No Model.) 3 Sheets—Sheet 3.
O. B. PECK.
APPARATUS FOR TREATING SLAG.
No. 433,138. Patented July 29, 1890.
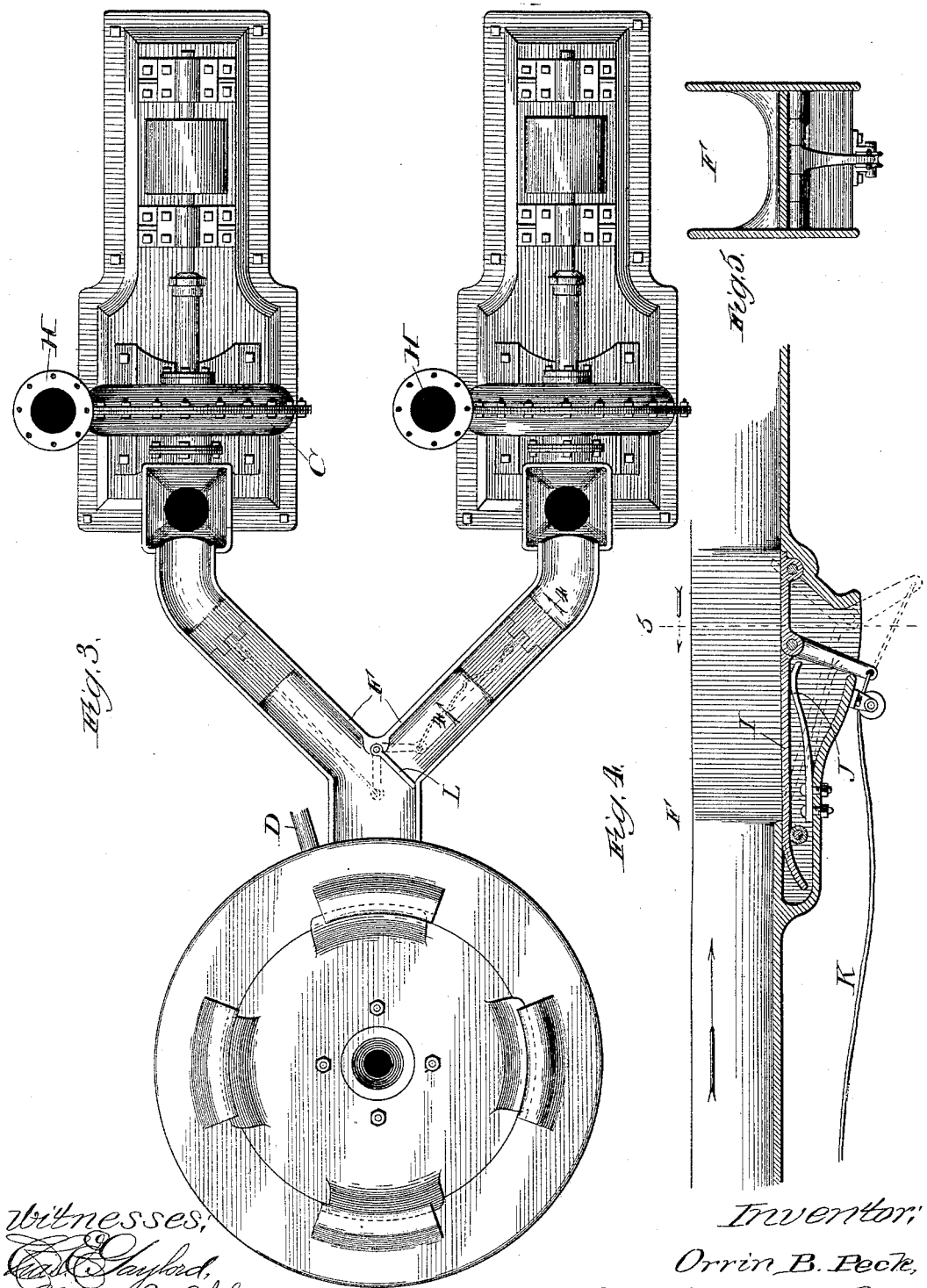
Witnesses:
Inventor:
Orrin B. Peck,
By Banning & Banning & Payson,
Att'ys

UNITED STATES PATENT OFFICE.

ORRIN B. PECK, OF CHICAGO, ILLINOIS, ASSIGNOR TO MELINDA PECK, OF SAME PLACE.

APPARATUS FOR TREATING SLAG.

SPECIFICATION forming part of Letters Patent No. 433,138, dated July 29, 1890.

Application filed March 3, 1890. Serial No. 342,427. (No model.)

*To all whom it may concern:*

Be it known that I, ORRIN B. PECK, a citizen of the United States, residing at Chicago, in the county of Cook and State of Illinois, have invented a new and useful Improvement in Smelting-Furnace Apparatus, of which the following is a specification.

The object of my invention is to provide means for granulating molten slag and pumping the granulated slag away; and the invention consists in the features and combinations hereinafter described and claimed.

In the accompanying drawings, Figure 1 is a side elevation, partly in section, of my improved granulating and pumping apparatus; Fig. 2, a plan view of the same; Fig. 3, the same as Fig. 2, except as to modifications in the slag-spouts; Fig. 4, a section taken in line 4 4 of Fig. 3, and Fig. 5 a cross-section taken in line 5 5 of Fig. 4.

V is the vessel, by means of which the molten slag is granulated; A, a shaft, by which the vessel is supported and rotated; B, journal-boxing; C, a centrifugal or force pump; D, a pipe or conduit for introducing water; E, a curb forming a chamber around the slag-vessel; F, a passage between the chamber and pump; H, a spout or conduit for carrying away the slag and water from the pump; I, the spring-actuated bottom of the trap; J, a spring for actuating such bottom; K, a cord for operating the gate in the discharge-pipes; and L, such gate.

My improved apparatus consists, essentially, of a centrifugal machine having a revolving vessel or receptacle adapted to receive the molten slag or product to be granulated and to discharge the same in small or divided particles; a pipe or conduit for introducing water and spraying it on the molten slag as the slag is discharged in particles from the receiving vessel or receptacle; a surrounding curb forming a chamber for arresting the water and granulated slag; a centrifugal or other force pump for pumping away the granulated slag and water, and suitable pipes or passages for connecting the pump with the machine and for carrying away the granulated slag and water.

The centrifugal machine is provided with a vessel or receptacle for receiving the molten slag and discharging it in divided particles. The rapid revolving of this receptacle causes the slag to be thrown off or out of it, preferably from the top, in a granulated state, or, rather, in finely-divided particles, which in cooling are solidified in a granulated state. Most of the separated particles thrown off or out from the receptacle are of a spherical form, so that when cooled most of the slag is in little round particles something like shot. This enables them to be pumped out with the least possible wear or injury to the machine.

The curb around the receiving vessel or receptacle forms an annular chamber—but the chamber may be in any other form desired—into which the finely-divided particles are thrown, and from which, after cooling, they pass into the passage or conduit leading to the pump. Through the pipe at the top water is introduced into the annular chamber, and, coming in contact with the separated particles of the molten slag, causes them to become quickly cooled and hardened, and thus prevents them from uniting or sticking together in mass. The water also assists in washing the granulated slag out of the chamber and enables it to be readily carried or pumped away.

I prefer to connect the chamber with the pump by means of a spout, as shown; but any other form of connection capable of enabling the granulated slag to pass from the chamber or machine to the pump—as, for instance, a mere opening in the chamber in position to permit the water and slag to run out into the pump—may be used.

As shown in Figs. 2 and 3, I provide for the use of two pumps, so that in case one becomes clogged or stopped up the stream of outflowing slag and water may be directed into and pumped off by the other. Although one pump will generally be found sufficient, I prefer to use two, so as to avoid the necessity of stopping the machine in case one becomes clogged or inoperative. In some cases, also, the spouts leading to the pumps, when two or more pumps are used, may be provided with traps, (see Figs. 3 and 5,) so that in case one pump becomes clogged the slag will accumulate on the trap and the weight of the accumulated slag will press the trap down and close that spout, thus causing all the outflowing water and granulated slag to be directed into the other spout and pump.

I prefer to employ a centrifugal pump for forcing or conducting away the water and granulated slag; but any other suitable pump capable of doing the work may be used for this purpose. The pump may of course be operated by power in any convenient way.

The discharge pipe or passage leading from the pump may be in any form and extended to any distance desired; but it will generally be found advisable to extend it to the point of final deposit for the slag.

In operation the molten slag is introduced into the revolving receptacle, thrown off or out by its rapid revolving, quickly cooled, and hardened by means of the water sprayed upon it, and washed or carried out to the pump and thence through the discharge-pipe to a place of deposit.

In my application, Serial No. 342,425, filed March 3, 1890, and in my application, Serial No. 342,435, filed March 3, 1890, and in my application, Serial No. 342,437, filed March 3, 1890, I show some of the features shown in the drawings of this application, but not claimed herein.

I claim—

1. The combination of a centrifugal machine provided with a revoluble receptacle adapted to receive molten material and throw the same off in finely-divided particles and also with a surrounding chamber and means for introducing water therein, a conduit or passage leading from the chamber, a pump with which the conduit or passage communicates, and a discharge pipe or conduit leading from the pump, whereby the slag may be granulated and the water and granulated slag forced from the machine to a place of deposit, substantially as described.

2. In combination with a centrifugal machine and pumps, branch conduits leading from the machine to the pumps, a movable gate at the junction of the branches, traps in each branch constructed to be actuated by the pressure of superincumbent slag, and connections between the gate and the traps, whereby an undue accumulation of slag upon the trap of either branch serves to throw the gate across the entrance to such branch, substantially as described.

ORRIN B. PECK.

Witnesses:
GEORGE S. PAYSON,
SAMUEL E. HIBBEN.